G. M. BARTH.
Weighing Cart.

No. 27,184.

Patented Feb. 14, 1860.

WITNESSES
Henry Horton
Horace See

INVENTOR
G. M. Barth.

UNITED STATES PATENT OFFICE.

GOTLIEB MARTIN BARTH, OF PHILADELPHIA, PENNSYLVANIA, ASSIGNOR TO HIMSELF AND D. D. JONES, OF SAME PLACE.

WEIGHING-CART.

Specification of Letters Patent No. 27,184, dated February 14, 1860.

*To all whom it may concern:*

Be it known that I, G. M. BARTH, of the city and county of Philadelphia and State of Pennsylvania, have invented certain new and useful Improvements in Weighing-Carts; and I do hereby declare the following to be a full, clear, and exact description of the same, reference being had to the accompanying drawing and to the letters of reference marked thereon.

My invention consists of certain devices described hereafter to be applied to a cart for the purpose of weighing the load deposited in the same.

In order to enable others skilled in the art to make and use my invention I will now proceed to describe its construction and operation.

Figure 1:
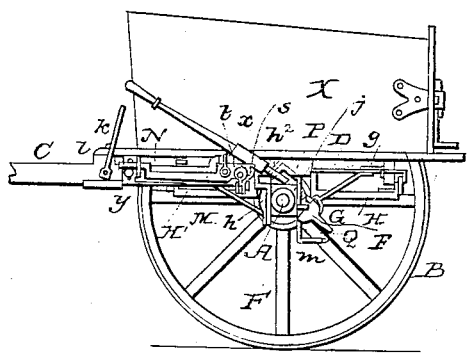
Figure 2:
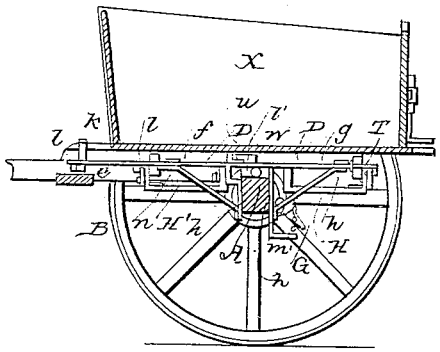
Figure 3:
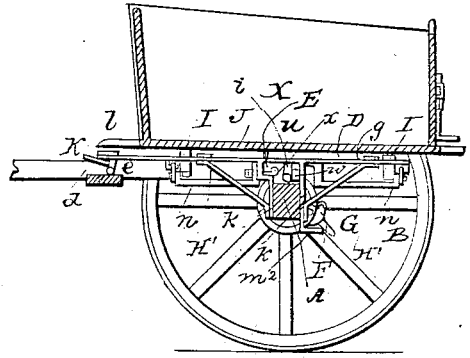
Figure 4:
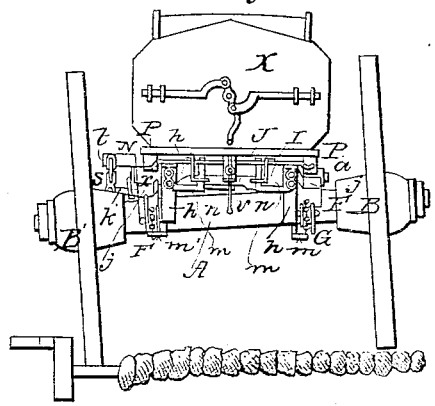
Figure 5:
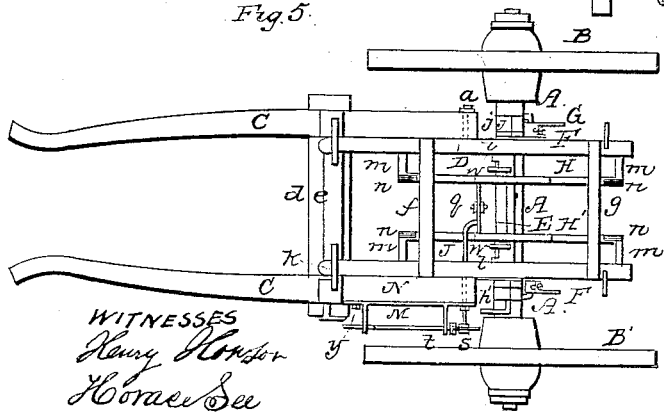
Figure 6:
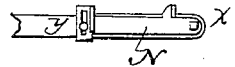

On reference to the accompanying drawing which forms a part of this specification. Figure 1, is a side view of my improved weighing cart, with one of the wheels removed. Fig. 2, a longitudinal section through the middle of the cart showing the body free from the weighing apparatus. Fig. 3, the same as Fig. 2, with the body resting on the weighing apparatus. Fig. 4 an end view of the cart, showing how the proper level of the body, and weighing apparatus may be preserved although one of the wheels is below the level of the other. Fig. 5, a plan view of the cart with the body removed, and Fig. 6, a detached view of part of the weighing apparatus.

Similar letters refer to similar parts throughout the several views.

A is the axle of the cart, B and B' its two wheels, and C and C' are the shafts connected by a transverse bar *d* each shaft being hinged at *a a* to the frame D which consists of two longitudinal bars connected together by transverse bars *f* and *g*.

On the under side of each of the longitudinal bars of this frame are projecting plates *h h* which fit one on one side and the other on the opposite side of the axle A so that the frame can be moved up and down vertically on the axle but can have no longitudinal movement independent of the same, the proper lateral position of the frame on the axle being maintained by the projections J J which are secured to the top of the axle and which will be more particularly alluded to hereafter. A shaft E which turns in the last mentioned projection is furnished with cams *i i* by means of which on turning the shaft by the arm *h'* the frame D may be elevated or lowered at pleasure.

To the rear of the axle are hung two segmental chain pulleys F, one near each side of the frame D, each pulley having a chain connected to a projection *m'* on the frame and having an arm G by moving which the segmental pulley is turned, causing the chain to lift that side of the frame D to which it is attached, so that one side of the frame may be elevated independently of the other.

A plate *e* situated between the shafts and having journals turning in the same, is furnished with projections *k* which when elevated overlap the ends of the longitudinal bars of the frame D as well as the projections *l l* in front of the body of the cart, both the latter and the frame D being released by turning the plate *e* and depressing its projections *k*.

H and H' are two bars, the projecting ends *m* of each of which are furnished with sharp edged pins, each pin pressing through and resting in a yoke or clevis hung loosely to the under side of the frame D, as best observed on reference to Fig. 4. On the opposite ends of each of the bars H and H' is a sharp edged projection *n*, and on the four projections rest the four plates I which are secured to the under side of the body X of the cart.

From the bar H projects the arm J and from the bar H' a shorter arm K the two arms being connected together at a point midway between the two bars by a loose link *q*.

The outer end of the arm J is connected by a loose link *s* Fig. 1, to the end of the short arm of the graduated lever M which has its fulcrum on a loose link *t* suspended to a pin on the plate N which is hinged to a pin *x* (Fig. 6) on one of the shafts of the cart the opposite end of the plate having a vertical slot through which passes a screw pin *y* into the shaft.

When the weighing portion of the apparatus is not used, the projections P P on the under side of the body X of the cart rest on the pointed projections *j j* on the axle, the projections *w w* on the shaft E overlap the plates *u u* on the under side of the cart body, the front of the latter is held to the shafts by the projections $k, k$, on the plate $e$ and the bars H and H' rest on the shaft F above the axle A.

It will be thus seen that the loose parts of the weighing apparatus rest on a solid bearing and are prevented from rattling about as the cart is drawn over the ground, the body of the cart itself being free from contact with the weighing apparatus and forming for the time being as permanent a portion of the shafts as a body of an ordinary coal cart.

When the weighing apparatus has to be brought into use the attendant turns the shaft E by means of the arm $h$ when the projections $w$ of the shaft become detached from the plates $u$ on the under side of the car, the frame D is elevated by the projections $i\ i$, the sharp edged projections $n\ n$ of the bars H and H', will be brought in contact with the plates I on the under side of the cart body, so that when the front end of the frame $d$ is released from the projections $k\ k$ by turning the plate $e$, the whole weight of the body of the cart and its contents will rest on the four sharp edged projections $n\ n$ of the bars H and H'.

The pressure of the body and its contents is transmitted from the bars H and H' through the arms J and K to the short arm of the lever M which is graduated and furnished with a weight in the same manner as the graduated levers of ordinary platform scales.

The great objection to the general introduction of weighing carts has been the inequality of the roads and streets which tends to throw the weighing apparatus out of the proper level and thus destroy the delicacy of its action. This difficulty is overcome by my improvement of the segmental pulley F and their arms G as by raising one or other of the arms one or other side of the frame D may be raised at pleasure and the weighing apparatus brought to the desired level which is indicated by a pendulous wire $v$ on the under side of the cart. This portion of my improvement will be best observed on reference to Fig. 4.

The plate N is adjusted according to the angle assumed by the shafts of the cart which will vary according to the height of the horse so that the graduated lever may be always maintained in proper position for indicating the weight of the load.

I claim as my invention and desire to secure by Letters Patent—

1. Connecting the frame D with its bars H and H' to the axle A so as to be confined laterally and longitudinally to the said axle and so that it may be elevated above the same either perpendicularly or on one side more than the other as and for the purpose set forth.

2. The shaft E with its projections or cams $i\ i$ and the projections $j\ j$ on the axle A, in combination with the frame D the bars H and H' with sharp edged projections $n\ n$ and the body X of the cart, the whole being so arranged that on turning the said shaft in one direction the body of the cart will be supported solely by and on the said sharp edged projections and on turning the shaft in the contrary direction the body of the cart shall be supported on the axles, and the bars H and H' on the shaft E as specified.

3. The graduated lever M connected to the bars H and H' by the arms J and K, and link $q$, in combination with the plate N the latter being pointed to and rendered adjustable on one of the shafts C, and the whole being arranged substantially in the manner herein set forth.

4. The shaft E with its projections $w, w$, in combination with the plates $u\ u$ on the under side of the body X, the whole being arranged as set forth for the purpose of retaining and releasing the said body.

In testimony whereof, I have signed my name to this specification, in the presence of two subscribing witnesses.

G. M. BARTH.

Witnesses:
HENRY HOWSON,
CHARLES D. FREEMAN.